(12) United States Patent
Miyamoto et al.

(10) Patent No.: US 9,435,427 B2
(45) Date of Patent: Sep. 6, 2016

(54) SHIFT DEVICE AND MANUFACTURING METHOD THEREFOR

(75) Inventors: Yoshihiro Miyamoto, Saitama (JP); Kunihiro Koike, Saitama (JP); Satoshi Hattori, Shizuoka (JP); Shuji Muraki, Shizuoka (JP)

(73) Assignees: Honda Motor Co., Ltd., Tokyo (JP); Atsumitec Co., Ltd., Shizuoka (JP)

( * ) Notice: Subject to any disclaimer, the term of this patent is extended or adjusted under 35 U.S.C. 154(b) by 391 days.

(21) Appl. No.: 14/129,563

(22) PCT Filed: Jun. 21, 2012

(86) PCT No.: PCT/JP2012/065799
§ 371 (c)(1),
(2), (4) Date: Dec. 27, 2013

(87) PCT Pub. No.: WO2013/002101
PCT Pub. Date: Jan. 3, 2013

(65) Prior Publication Data
US 2014/0123798 A1  May 8, 2014

(30) Foreign Application Priority Data

Jun. 28, 2011 (JP) ................................. 2011-142638
Jun. 28, 2011 (JP) ................................. 2011-142647

(51) Int. Cl.
*B60K 20/02*  (2006.01)
*F16H 59/10*  (2006.01)
(Continued)

(52) U.S. Cl.
CPC ............... *F16H 59/10* (2013.01); *B60K 20/02* (2013.01); *F16H 59/0278* (2013.01); *G05G 1/06* (2013.01);
(Continued)

(58) Field of Classification Search
CPC .... B60K 20/02; F16H 59/0278; G05G 1/06; G05G 1/503
See application file for complete search history.

(56) References Cited

U.S. PATENT DOCUMENTS 5,575,175 A * 11/1996 Kataumi ................. F16H 59/10
403/327
5,768,944 A * 6/1998 Inuzuka .............. F16H 59/0204
74/335

(Continued)

FOREIGN PATENT DOCUMENTS

CN    201633544 U    11/2010
CN    201792747 U    4/2011

(Continued)

OTHER PUBLICATIONS

Office Action issued on Aug. 13, 2015 by the Chinese Patent Office for corresponding Chinese Patent Application No. 201280031572.5.

*Primary Examiner* — David M Fenstermacher
(74) *Attorney, Agent, or Firm* — Carrier Blackman & Associates, P.C.; William D. Blackman; Joseph P. Carrier

(57) ABSTRACT

In the present invention, an operation knob is provided with a knob outer section that forms an outer shell, and a knob inner section into which one edge of a lever section is inserted. The knob inner section has a claw section that allows insertion when the lever section is inserted, and once the lever section has been inserted, hooks the lever section towards the inner side of the knob inner section. A groove section is formed in the lever section and extends in a direction perpendicular to the axis direction of the lever section. The knob outer section is made up of two parts, which are an outer casing and a knob cover. The knob cover is provided with protruding sections, which protrude towards the outer casing and fit into the groove section when the lever section is attached to the knob inner section.

12 Claims, 9 Drawing Sheets

(51) Int. Cl.
  *F16H 59/02* (2006.01)
  *G05G 1/06* (2006.01)
  *G05G 1/50* (2008.04)
  *G05G 1/04* (2006.01)

(52) U.S. Cl.
  CPC ............... G05G 1/503 (2013.01); *G05G 1/04* (2013.01); *Y10T 29/49885* (2015.01); *Y10T 74/2014* (2015.01)

(56) References Cited

U.S. PATENT DOCUMENTS

| | | | | |
|---|---|---|---|---|
| 5,924,540 A * | 7/1999 | Kim | ........................ | F16H 59/10 192/220.4 |
| 6,148,686 A * | 11/2000 | Kataumi | ............. | F16H 59/0204 74/473.12 |
| 6,301,994 B1 * | 10/2001 | Syamoto | ................. | F16H 59/10 74/473.3 |
| 2001/0047694 A1 * | 12/2001 | Yokawa | ................. | F16H 59/10 74/473.21 |
| 2002/0112557 A1 * | 8/2002 | Burger | ................. | F16H 59/042 74/473.3 |
| 2008/0022805 A1 * | 1/2008 | Howe | .................... | F16H 61/22 74/527 |
| 2014/0123798 A1 * | 5/2014 | Miyamoto | .......... | F16H 59/0278 74/473.3 |

FOREIGN PATENT DOCUMENTS

| | | |
|---|---|---|
| JP | 3034519 U | 2/1997 |
| JP | H09188159 A | 7/1997 |
| JP | H11-278085 A | 10/1999 |
| JP | 2004-513000 A | 4/2004 |
| JP | 2004-203163 A | 7/2004 |
| JP | 2009255815 A | 11/2009 |
| WO | 02/01093 A1 | 1/2002 |

* cited by examiner

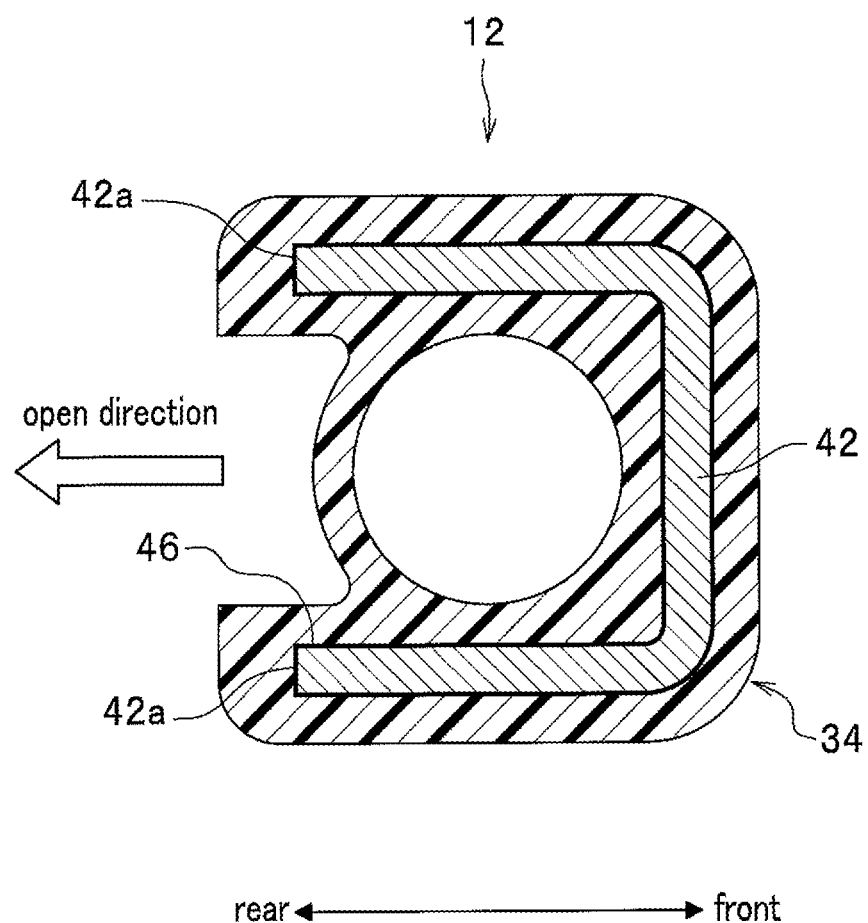

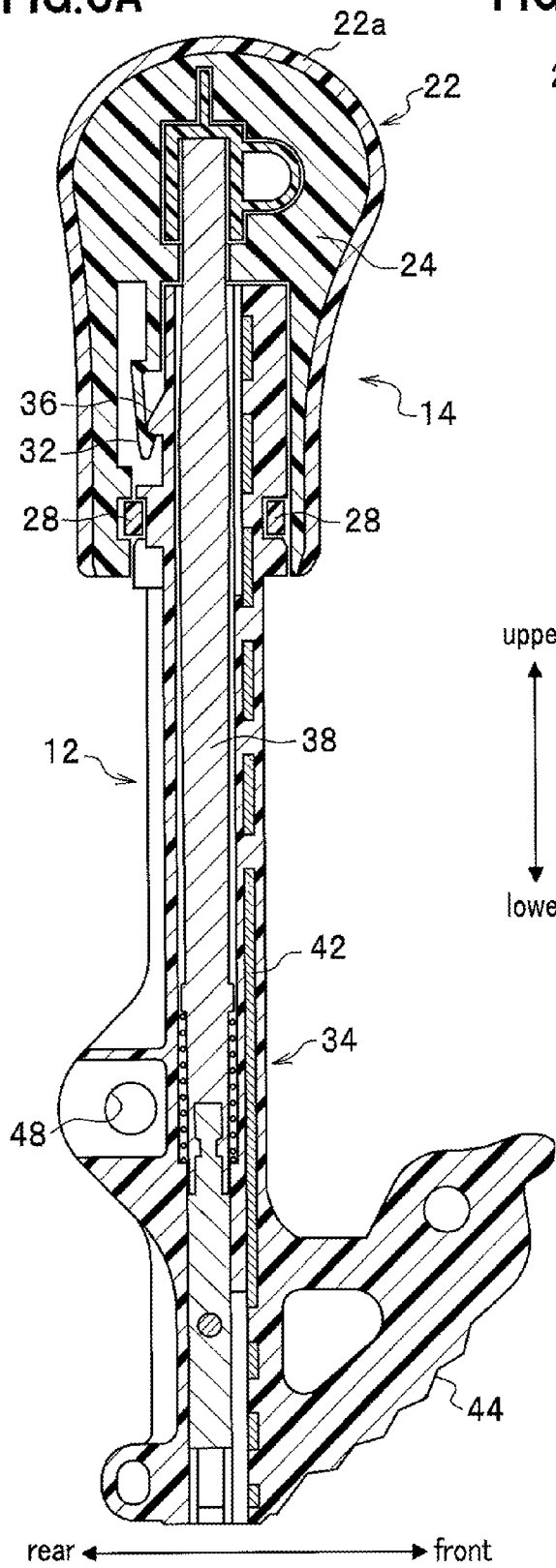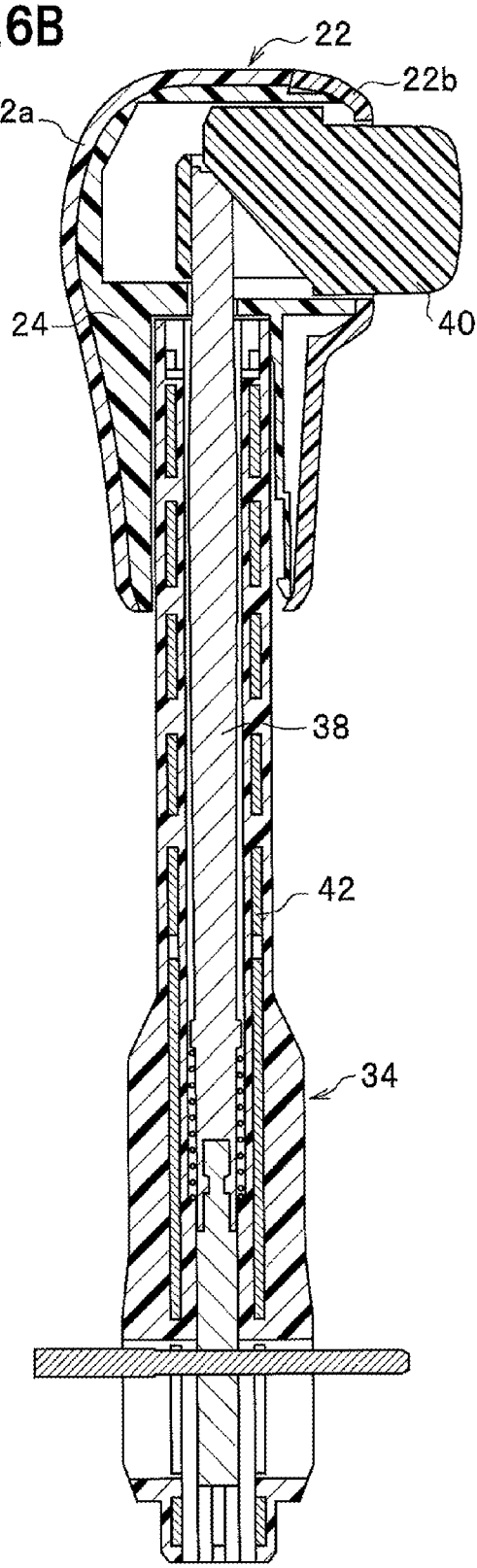

rear ← → front

SHIFT DEVICE AND MANUFACTURING METHOD THEREFOR

TECHNICAL FIELD

The present invention relates to a shift device that enables performing shift operation of a vehicle and a manufacturing method therefor.

BACKGROUND ART

For example, Patent Document 1 discloses a shift device provided with a shift knob main body and a shaft connected to the shift knob main body. This shift device is equipped with a fastener in the shift knob main body, and this fastener prevents the shift knob main body from sliding down off the shift.

The fastener is provided with an elastic flange that engages with an inclined surface of the shaft and acts each other with the inclined surface of the shaft so as to removably hold the shift knob main body.

Further, regarding this type of a shift device, for example, Patent Document 2 discloses a fitting structure in which the lower end portion of an operation knob surrounds the upper end portion of a shift lever in a pipe shape, and a screw, which penetrates through a fitting hole of the lower end portion of the operation knob, is screwed into the screw hole of the shift lever.

Further, Patent Document 3 discloses an attachment structure in which an operation knob and a lever main body are connected by a U-shaped pin that engages with a cut-out groove.

RELATED ART DOCUMENTS

Patent Documents

Patent Document 1 : Japanese Unexamined Patent Application Publication (Translation of PCT Application) No. 2004-513000

Patent Document 2 : Japanese Patent Application Laid-Open No. H11-278085

Patent Document 3 : Japanese Patent Application Laid-Open No. 2004-203163

DISCLOSURE OF THE INVENTION

Problems to be Solved by the Invention

However, with the structure of the shift device disclosed by Patent Document 1, for example, in a case that a strong force acts on the shift knob main body along the direction in which the shaft knob main body is pulled off from the shaft, the elastic flange of the fastener goes over the inclined surface of the shaft to bend such as to become out of a notch, and the shift knob main body is pulled off from the shaft.

Accordingly, in the case of Patent Document 1, the shift knob main body is possibly pulled off from the shaft when a strong force is applied, for example, by shift operation by a driver in emergency to the shift knob main body in the direction in which the shift knob main body is pulled off from the shaft.

Further, for the attachment structure disclosed by Patent Document 2, in manufacturing the shift lever, it is necessary to carry out hole machining to form a screw hole after machining a metal plate into a pipe shape, and the manufacturing cost (machining cost) significantly rises. Still further, for the structure disclosed by Paten Document 3, it is necessary to carry out groove machining of the outer circumferential surface of the shift lever so that the U-shaped pin is fitted, and the manufacturing cost (machining cost) significantly rises likewise as in the case of Patent Document 2.

This is because, for the fitting structures disclosed by Patent Document 2 and Patent Document 3, it is necessary to use a cylindrical component or a solid component of metal for the shift lever to ensure the stiffness and the strength of the shift lever.

A general object of the invention is to provide a shift device capable of ensuring prevention of the operation knob from being pulled off from the lever part.

A main purpose of the present invention is to provide a shift device capable of reducing the manufacturing cost and ensuring the adequate stiffness and strength of the lover part.

Another object of the present invention is to provide a manufacturing method for a shift device capable of reducing the manufacturing cost and ensuring the adequate stiffness and strength of the lover part.

Means for Solving the Problems

In order to attain the above-described object, in the present invention, a shift device, includes: a lever part for selecting a drive gear position or a drive range; and an operation knob provided at an upper end of the lever part, wherein the operation knob includes: a knob outer portion forming an outer portion of the operation knob; and a knob inner portion that is housed in the knob outer portion, wherein one end portion of the lever part is inserted in the knob inner portion, wherein the knob inner portion includes a claw portion that allows insertion of the lever part when the lever part is to be inserted and hooks the lever part toward inside of the knob inner portion after the lever part is inserted, wherein the lever part is provided with a slot shaped portion or a through-hole shaped portion extending along a direction perpendicular to an axial direction of the lever part, wherein the knob outer portion is formed in at least two divisions, and wherein one division of the divided knob outer portion is provided with a protruding portion that protrudes toward the other one division of the divided knob outer portion and is fitted within the slot shaped portion or the through-hole shaped portion in a state that the lever part is attached to the knob inner portion.

According to the present invention, in attaching the lever part and the operation knob to each other, as it is possible to easily and simply hold the lever part by only inserting the lever portion into the knob inner portion and the lever part is hooked by the claw portion toward inside of the nob inner portion, backlash of the lever part along the axial direction can be reduced. Further, according to the present invention, for example, when a heavy load is applied to the operation knob along the pull-off direction, even if it happens that the lever part separates off from the claw portion, as the protruding portion of the knob outer portion is fitted inside the slot shaped portion or the through-hole shaped portion of the lever part, the operation knob is ensured to be prevented from getting off from the lever part.

Further, according to the present invention, a gap is formed between the slot shaped portion or the through-hole shaped portion and the protruding portion in a state that the protruding portion is inserted in the slot shaped portion or the through-hole shaped portion.

According to the present invention, a gap is formed between the slot shaped portion or the through-hole shaped portion and the protruding portion along the attachment direction (insertion direction) between the operation knob and the lever part. Thus, even in case that a dimension error is caused, for example, by a manufacturing error or the like, the dimension error is absorbed by the gap, and the lever part is accordingly not inhibited from being hooked by the claw portion so that the lever part can be hooked by the claw portion. As a result, according to the present invention, it is ensured that relative positioning between the operation knob and the lever part can be performed in attaching them to each other.

Yet further, according to the present invention, the lever part includes: a metal lever plate extending along the axial direction of the lever part; and a lever outer circumferential portion that coats an outer surface of the lever plate by a resin material and is joined with the operation knob, and the lever plate is formed with an open cross-sectional shape opening in a direction perpendicular to the axial direction of the lever part.

According to the present invention, as the lever plate is formed with an open cross-sectional shape having an opening portion, it is possible to form a metal lever plate by only stamping. Thus, it is not necessary to perform hole machining nor slot machining of a shift lever, unlike a conventional technology, which uses a cylindrical component or a solid component. Thus, it is possible to simplify the manufacturing process and reduce the manufacturing cost (machining cost).

Further, according to the present invention, the lever outer circumferential portion is formed by molding that coats the metal lever plate by a resin material, for example. Accordingly, by providing in advance a mold (casting mold) with an attachment structure to be attached to the operation knob, it is possible to easily perform integral forming As a result, according to the present invention, the manufacturing cost can be reduced.

Still further, according to the present invention, by forming the metal lever part by coating the outer surface of the metal lever plate by a resin material, adequate stiffness and strength of the lever part are ensured. As a result, according to the present invention, while the manufacturing cost (machining cost) is reduced, adequate stiffness and strength of the lever part are ensured.

Yet further, according to the present invention, the lever outer circumferential portion is provided with a hook portion that hooks the claw portion of the knob inner portion, in the open direction of the lever plate.

According to the present invention, as the hook portion that hooks the claw portion is arranged at a part in the open direction where the lever plate is not provided inside the lever outer circumferential portion, the resin hook portion is also deformable when the hook portion engages with the claw portion. As a result, according to the present invention, the lever part can be easily inserted into the knob inner portion, and the stiffness of the lever part itself is ensured by the metal lever plate.

Still further, according to the invention, the lever plate is arranged on a vehicle body side such that the open direction is along front/rear direction of a vehicle.

For a conventional shift device, in general, a structure by which an operation knob is moved forward and backward in the vehicle front/rear direction is adopted, and a load is often applied to a lever part in the vehicle front/rear direction. In this situation, in the present embodiment, by setting the open direction of the lever plate in the vehicle front/rear direction, desired stiffness and strength against a load during operation of a shift device can be attained, and the durability can thereby be improved, even when the lever plate has an open cross-sectional shape (for example, a substantially C-shaped cross-section, a substantially U-shaped cross-section, or the like).

Yet further, according to the present invention, a bracket for attaching the lever part to the vehicle body side is provided, wherein the bracket is provided with a rotation shaft that rotatably supports the lever part, wherein the lever outer circumferential portion includes a first extended portion that extends in either front direction or rear direction of the vehicle and is supported by the rotation shaft, and wherein the lever plate includes a second extended portion that is open in a direction where the first extended portion is provided, the direction being out of the front/rear directions of the vehicle, wherein the second extended portion is formed by that an open end portion of the lever plate is extended into inside of the first extended portion.

Yet further, according to the present invention, the open direction of the open cross-sectional shape of the metal lever plate is set to the direction where the first extended portion of the lever outer circumferential portion is provided, and further, the second extended portion is provided by extending the open end portion of the lever plate to the inside of the first extended portion. Thus, it is possible to increase the strength of the part in the vicinity of the first extended portion of the resin lever outer circumferential portion, which is fitted rotatably with respect to the bracket, and reduce the machining cost for reinforcing the first extended portion. This is because, for example, like a case of a conventional technology, in case that a lever part is formed by a pipe component, and this pipe component is coated by a resin lever outer circumferential portion to thereby form a first extended portion, it is necessary to arrange an extra component by welding or the like in order to reinforce the strength and the stiffness of the first extended portion, and the machining cost significantly increases.

Still further, according to the present invention, provided is a manufacturing method for a shift device that includes a lever part for selecting a drive gear position or a drive range and an operation knob provided at an upper end of the lever part, the method including: a process for forming, by stamping, a metal lever plate that extends along an axial direction of the lever part, wherein a cross-section, of the metal lever plate, perpendicular to the axial direction is in a shape having an opening portion only in one direction; and a process for forming a lever outer circumferential portion that coats an outer surface of the lever plate by a resin material and is joined with the operation knob, wherein the lever plate has an open cross-sectional shape that is open in a direction perpendicular to the axial direction of the lever part.

According to the present invention, a metal lever plate is formed into a component having an open cross-sectional shape with an opening portion by stamping. Further, by performing resin molding for coating the outer surface of the lever plate by a resin material, the lever part can be easily manufactured by a simple process. According to the present invention, by adopting such a manufacturing method, the manufacturing cost can be reduced and adequate stiffness and strength of the lever part are ensured.

Advantages of the Invention

According to the present invention, it is possible to obtain a shift device capable of ensuring prevention of an operation knob from being pulled off from a lever part.

Further, according to the present invention, it is possible to obtain a shift device that allows reduction in the manufacturing cost and ensures adequate stiffness and strength of a lever part.

Still further, according to the present invention, it is possible to obtain a manufacturing method, for a shift device, that allows reduction in the manufacturing cost and ensures adequate stiffness and strength of a lever part.

BRIEF DESCRIPTION OF THE DRAWINGS

FIG. 5 is a cross-sectional view taken along line V-V in FIG. 4;

FIGS. 6A and 6B are vertical cross-sectional views of the operation knob and the lever part, taken along the upper/lower direction;

EMBODIMENT FOR CARRYING OUT THE INVENTION

Figure 1:
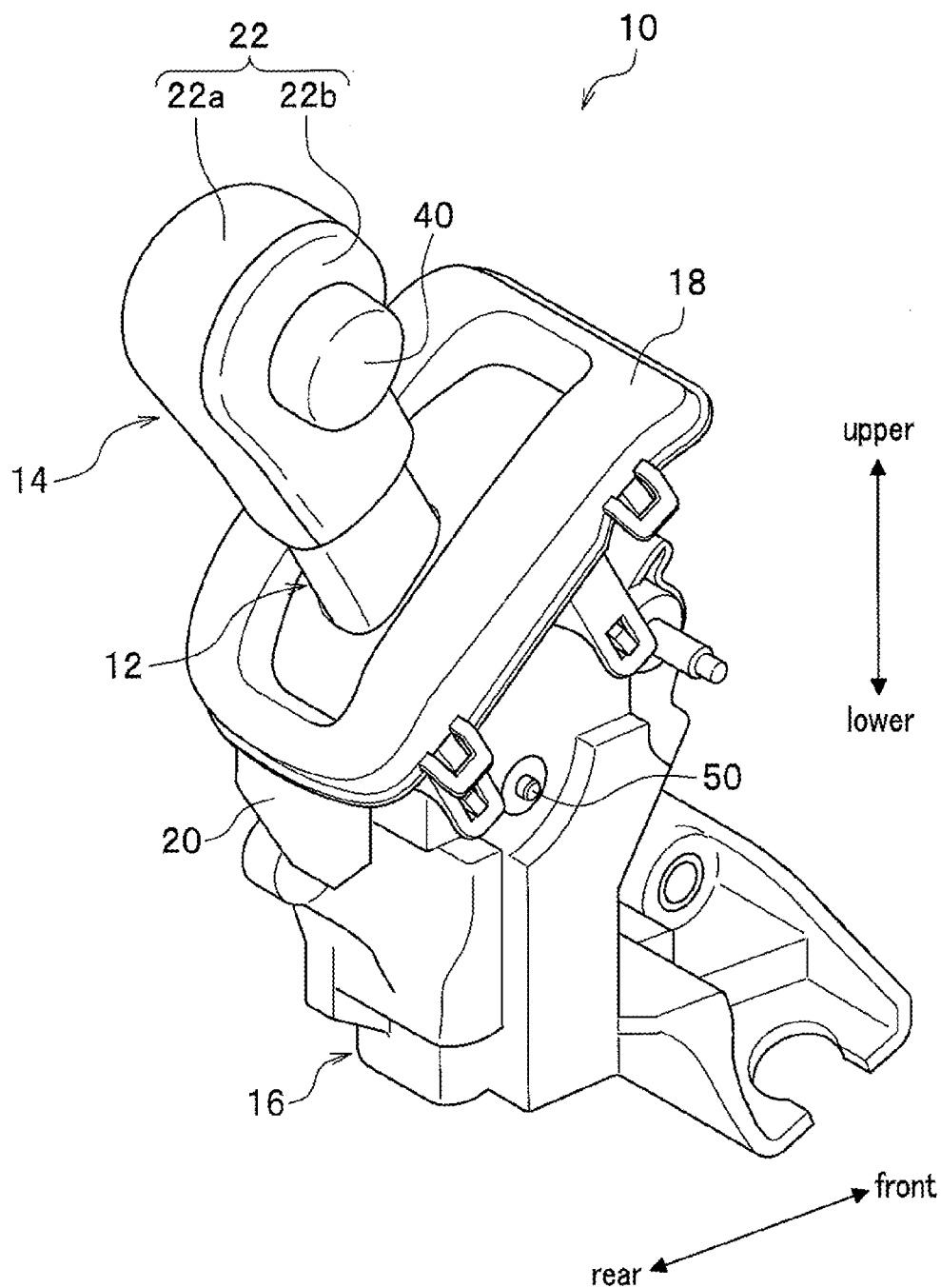
FIG. 1 is a schematic perspective view of a shift device in an embodiment according to the present invention.
Figure 2:
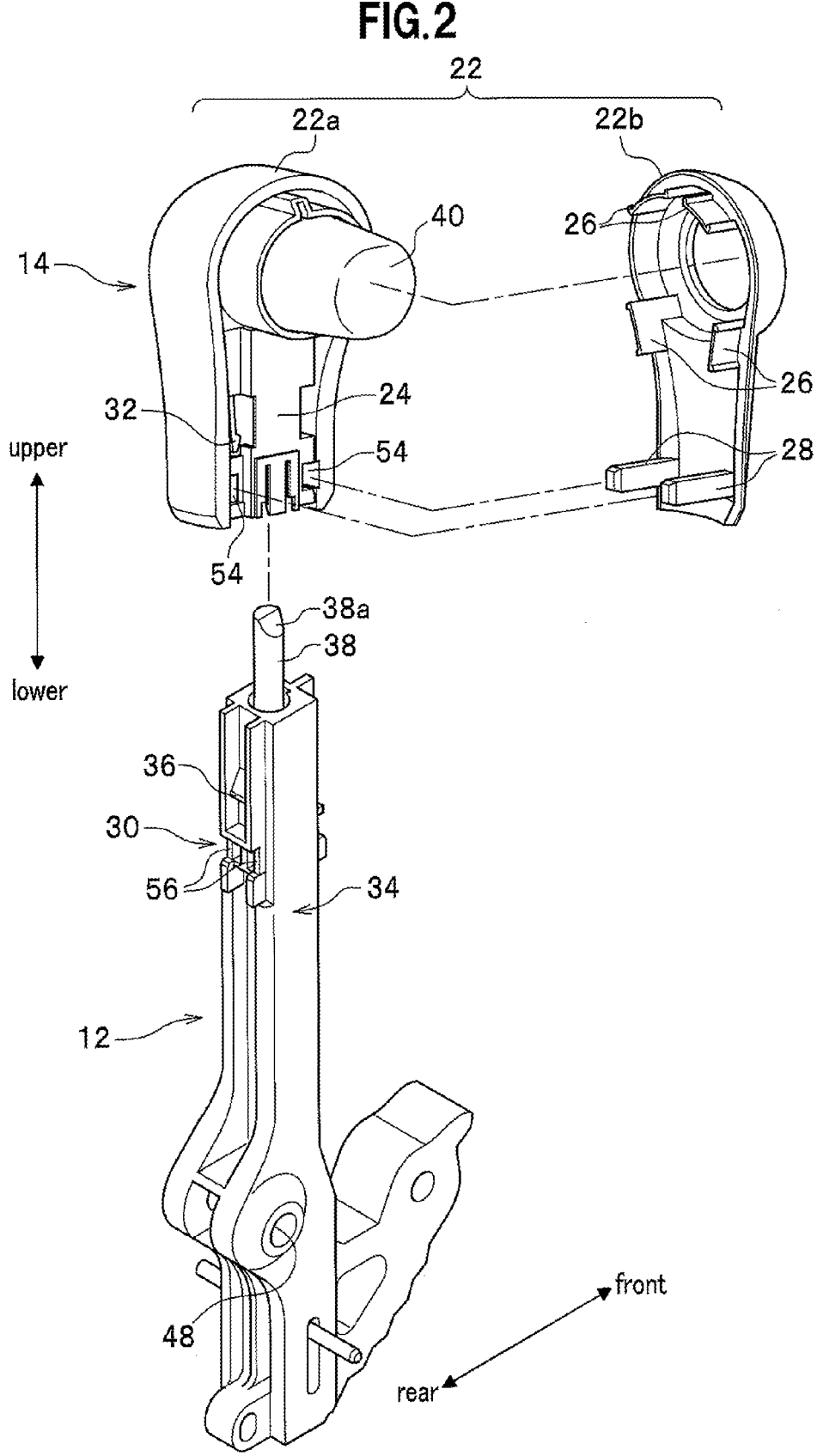
FIG. 2 is a schematic exploded perspective view of the shift device shown in FIG. 1.
Figure 3:
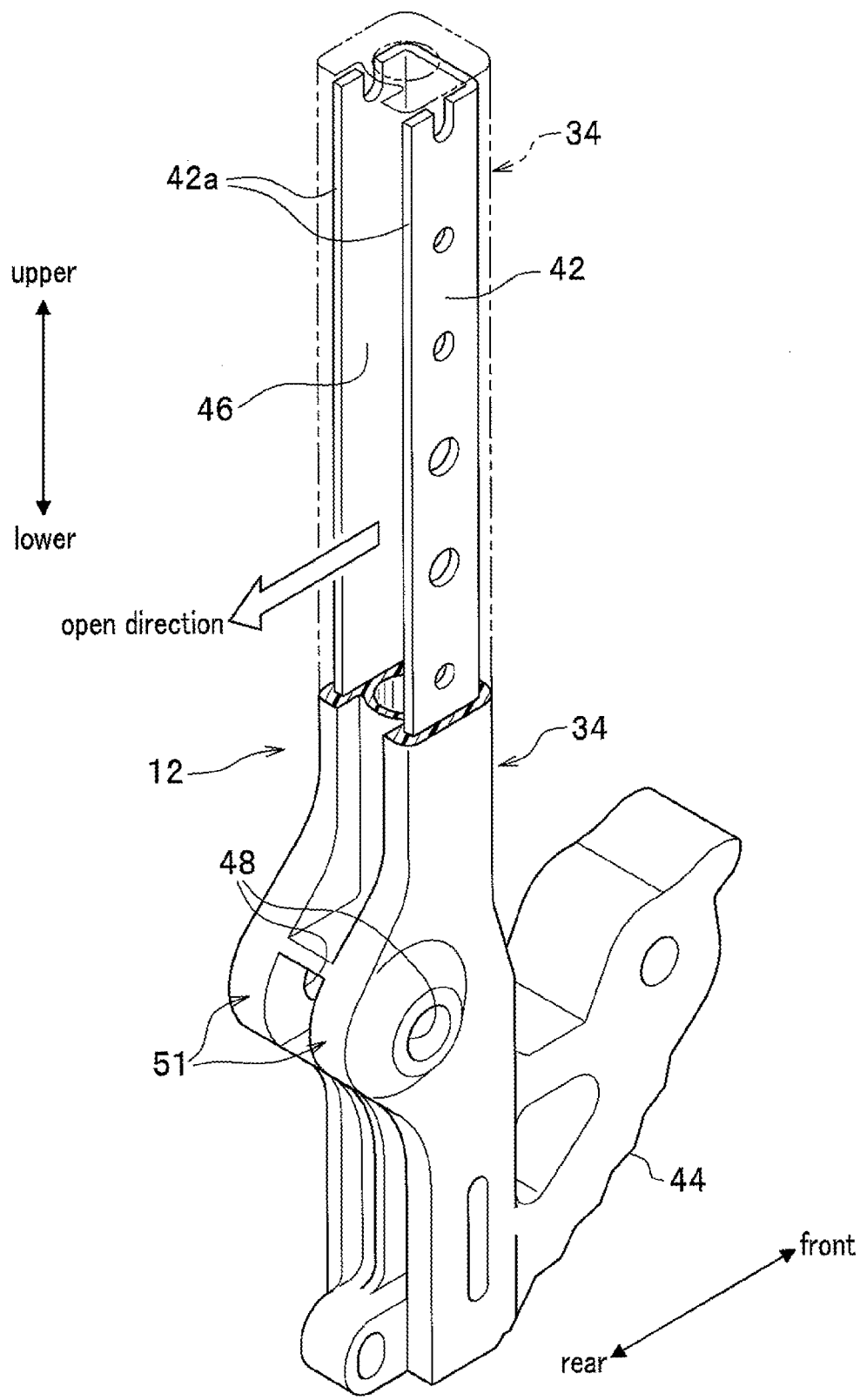
FIG. 3 is a partially transparent perspective view of a lever part that constructs the shift device shown in FIG. 1.
Figure 4:
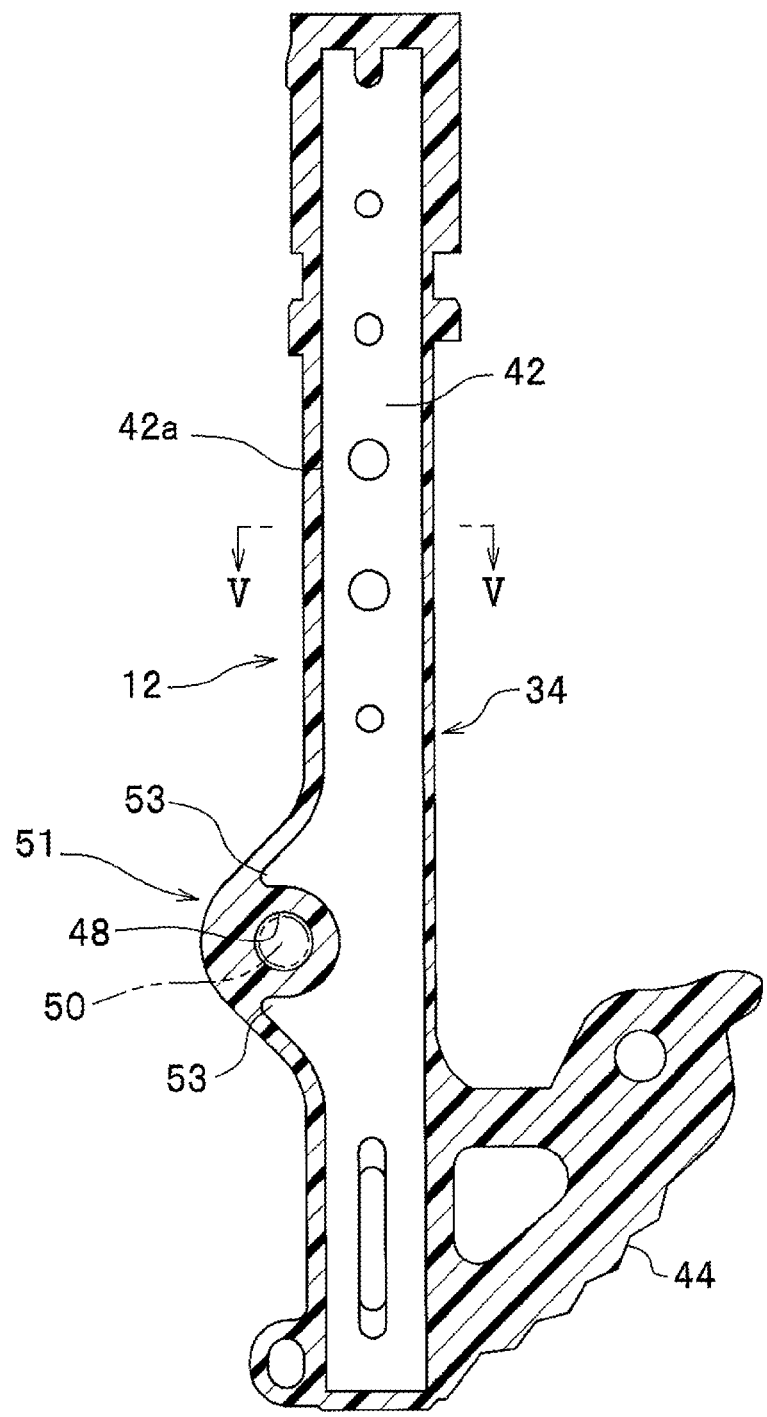
FIG. 4 is a partially cut-off cross-sectional view, wherein the outer circumferential portion of the lever part is cut off.

An embodiment according to the present invention will be described below in detail, referring to the drawings, as appropriate. FIG. 1 is a schematic perspective view of a shift device in an embodiment according to the present invention. FIG. 2 is a schematic exploded perspective view of the shift device shown in FIG. 1. FIG. 3 is a partially transparent perspective view of a lever part. FIG. 4 is a partially cut-off cross-sectional view, wherein the outer circumferential portion of the lever part is cut off. FIG. 5 is a cross-sectional view taken along line V-V in FIG. 4. In the respective views, 'front/rear' and 'upper/lower' respectively represent the vehicle front/rear directions and the vehicle upper/lower directions.

A shift device 10 in the present embodiment according to the present invention has a function to shift the drive range or the drive gear position of an automatic transmission mounted on a vehicle, not shown, wherein the shift device 10 is arranged, for example, on the substantially central lower side of a floor console (floor shift) or an instrument panel (instrument panel shift) that is arranged between the driver's seat and the front passenger seat.

As shown in FIG. 1, the shift device 10 includes a lever part 12 for selecting a desired drive gear position or a desired drive range of an automatic transmission, not shown, and an operation knob 14 provided at the upper end of the lever part 12. Further, the shift device 10 is provided with a rotation shaft 50 for rotatably supporting the lever part 12, and includes a bracket 16 for attaching the lever part 12 on the vehicle body side, not shown, an escutcheon cover 18 attached to a certain operation part, and a lever cover 20 that surrounds the lever part 12 and is displaced together with the lever part 12.

The operation knob 14 includes, as shown in FIG. 2, a knob outer portion 22 forming the outer portion of the operation knob 14 and a knob inner portion 24 that is housed by the knob outer portion 22, wherein the upper end portion of the lever part 12 is inserted in the knob inner portion 24. The knob outer portion 22 and the knob inner portion 24 are formed by a resin material.

The knob outer portion 22 is formed in two divisions that are an outer casing 22a having a frame body that surrounds the knob inner portion 24 and a knob cover 22b that closes the opening portion of the outer casing 22a. In this case, a plurality of positioning protruding pieces 26, which are provided on the knob cover 22b, are engaged with the inner wall of the outer casing 22a, and the outer casing 22a and the knob cover 22b are thereby integrally attached to each other in a state that the positioning therebetween is determined.

Further, the lower end inner wall of the knob cover 22b, which is one of the two divisions forming the knob outer portion 22, is provided with a pair of protruding portion 28 substantially in parallel to each other, wherein the protruding portions 28 are substantially perpendicular to the cover main body of the knob cover 22b and protrude toward the other division, namely the outer casing 22a. As shown in FIG. 6A, these protruding portions 28 are formed in a solid shape with a cross-section substantially in a rectangular shape, however, the protruding portions 28 may be formed in a hollowed shape having a chamber therein. Incidentally, these paired protruding portions 28 form a latch structure that are fitted to slot portions 30 formed on the lever part 12 and thereby have a function to prevent the lever part 12 from moving off. Although the paired protruding portions 28 are formed from a resin material integrally with the knob cover main body, the protruding portions 28 may be formed separately from the knob cover main body.

The knob inner portion 24 is provided with a claw portion 32 that allows insertion of the lever part 12 when the lever part 12 is inserted into the hole portion of the knob inner portion 24, and after the lever part 12 is inserted, the claw portion 32 hooks the lever part 12 toward the inside of the knob inner portion 24. The claw portion 32 is provided at the tip end portion of a vertical wall that adjoins an fitting hole into which the lever part 12 is inserted, and, as described later, the claw portion 32 engages, inside the knob inner portion 24, with the hook portion 36 of the lever outer circumferential portion 34 so that positioning along the upper/lower direction is made.

Further, the knob inner portion 24 is provided with an unlocking button 40 that engages with the inclined surface 38a of a lock pin 38 and is urged by a spring force of a spring, not shown, wherein the unlocking button 40 is exposed from the opening portion of the knob cover 22b to outside. When an operator, who grips the operation knob 14, shifts the range, the driver presses the unlocking button 40 to displace the lock pin 38 downward so as to release a locked state in a certain range.

As shown in FIG. 3, the lever part 12 is provided with a metal lever plate 42 that substantially linearly extends from one end portion to the other end portion along the axial direction of the lever part 12, and a resin lever outer circumferential portion 34 that coats the outer circumferential surface of the lever plate 42 by a resin material (resin molding) and is inserted in the fitting hole of the operation knob 14. Incidentally, on the lower side of the lever outer circumferential portion 34, there is provided a detent portion

44 that has a waved shape, applies a nodal feeling (detent load) through a detent plunger, not shown, and holds a certain range position.

The metal lever plate 42 is, as shown in FIG. 5, formed with an open cross-sectional shape having an opening portion 46 that is open in a direction substantially perpendicular to the axial direction of the lever part 12. Incidentally, in the present embodiment, the transverse cross-section of the lever plate 42 is formed in a cross-sectional shape, shown in FIG. 5, as an example, however, without being limited thereto, the transverse cross-section of the lever plate 42 may have any open cross-sectional shape as long as the transverse cross-section has an opening portion (having an opening portion toward only one direction) at least at a part of the cross-sectional shape, such as a substantially C-shape, a substantially U-shape, a substantially V-shape, a substantially H-shape, a substantially L-shape, or the like.

Further, in the present embodiment, the direction, toward which the opening portion 46 of the lever plate 42 with an open cross-sectional shape is arranged (the direction of the openness), is represented by the rear direction along the vehicle front/rear direction (see FIG. 5), as an example, however, without being limited there to, the direction may be the front direction along the vehicle front/rear direction.

As shown in FIG. 4, a penetrating support hole 48 is provided at the middle portion of the resin lever outer circumferential portion 34. In the support hole 48, inserted is the rotation shaft 50 (see FIG. 1), which support the operation knob 14 and the lever part 12 rotatably around the support hole 48 by a certain angle.

The resin lever outer circumferential portion 34 extends (expands) backward along the vehicle front/rear direction in a curved cross-sectional shape, and includes a first extended portion 51 supported by the rotation shaft 50 that is axially fitted to the support hole 48. Further, the metal lever plate 42 coated by the lever outer circumferential portion 34 includes a second extended portion 53 that is open toward the vehicle rear direction out of the vehicle front/rear directions, the vehicle rear direction being the same direction as the direction toward which the first extended portion 51 is provided, and is extended (expanded) to the inside of the first extended portion 51 in such a manner that the open end portion 42a of the lever plate 42 sandwiches the rotation shaft 50 from the upper and lower directions.

In this case, the second extended portion 53 formed on the metal lever plate 42 is not formed linearly in parallel to the axial direction similarly to the open end portion 42a other than the second extended portion 53, but is formed, protruding in an arc shape such as to curve, around the rotation shaft 50, in an arc shape to the inside and along the first extended portion 51. In other words, the second extended portion 53 is formed substantially in a mountain shape in side view, and is formed by a protruding portion protruding toward the side of the first extended portion 51 (in the direction perpendicular to the axial direction of the lever plate 42), and not toward the side of the center of the rotation shaft 50. As a result, as described later, the strength and the stiffness of the first extended portion 51, which is a portion adjacent to the rotation shaft 50, can be increased.

Figure 7A:
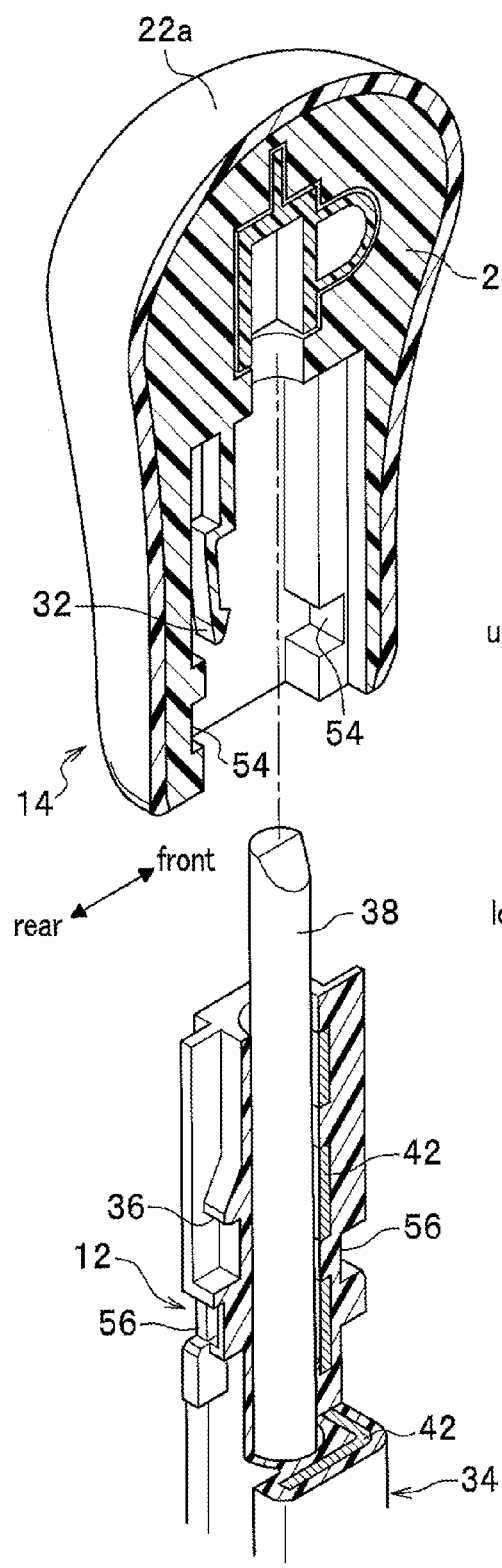
FIGS. 7A and 7B are partially cross-sectional exploded perspective view showing a claw portion and a hook portion.
Figure 7B:
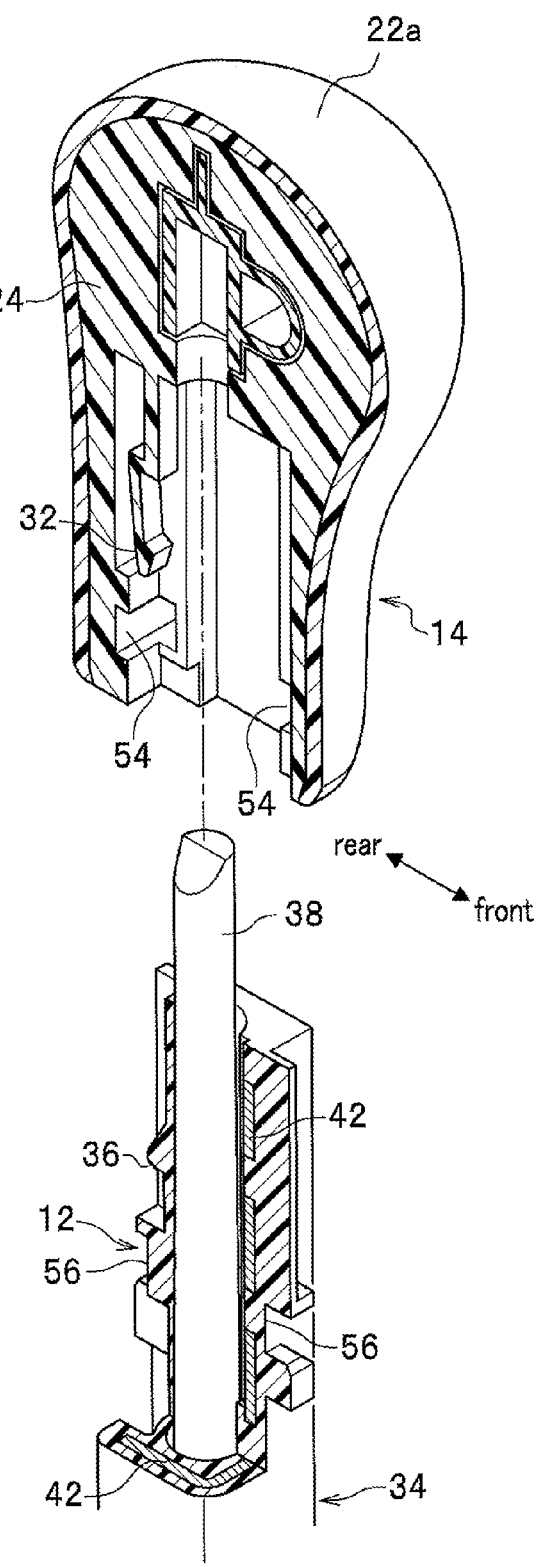

FIGS. 6A and 6B are vertical cross-sectional views of the operation knob and the lever part, taken along the upper/lower direction. FIGS. 7A and 7B are partially cross-sectional exploded perspective views showing a claw portion and a hook portion.

As shown in FIGS. 2, 6, and 7, the upper portion of the lever outer circumferential portion 34 is provided with the hook portion 36 formed by a protrusion with an acute angle expanding in a direction substantially perpendicular to the axial direction. The hook portion 36 protrudes in the same direction as the above-described direction toward which the opening portion 46 of the lever plate 42 is provided (open direction), and is stopped by being hooked by the claw portion 32 of the knob inner portion 24.

Figure 8:
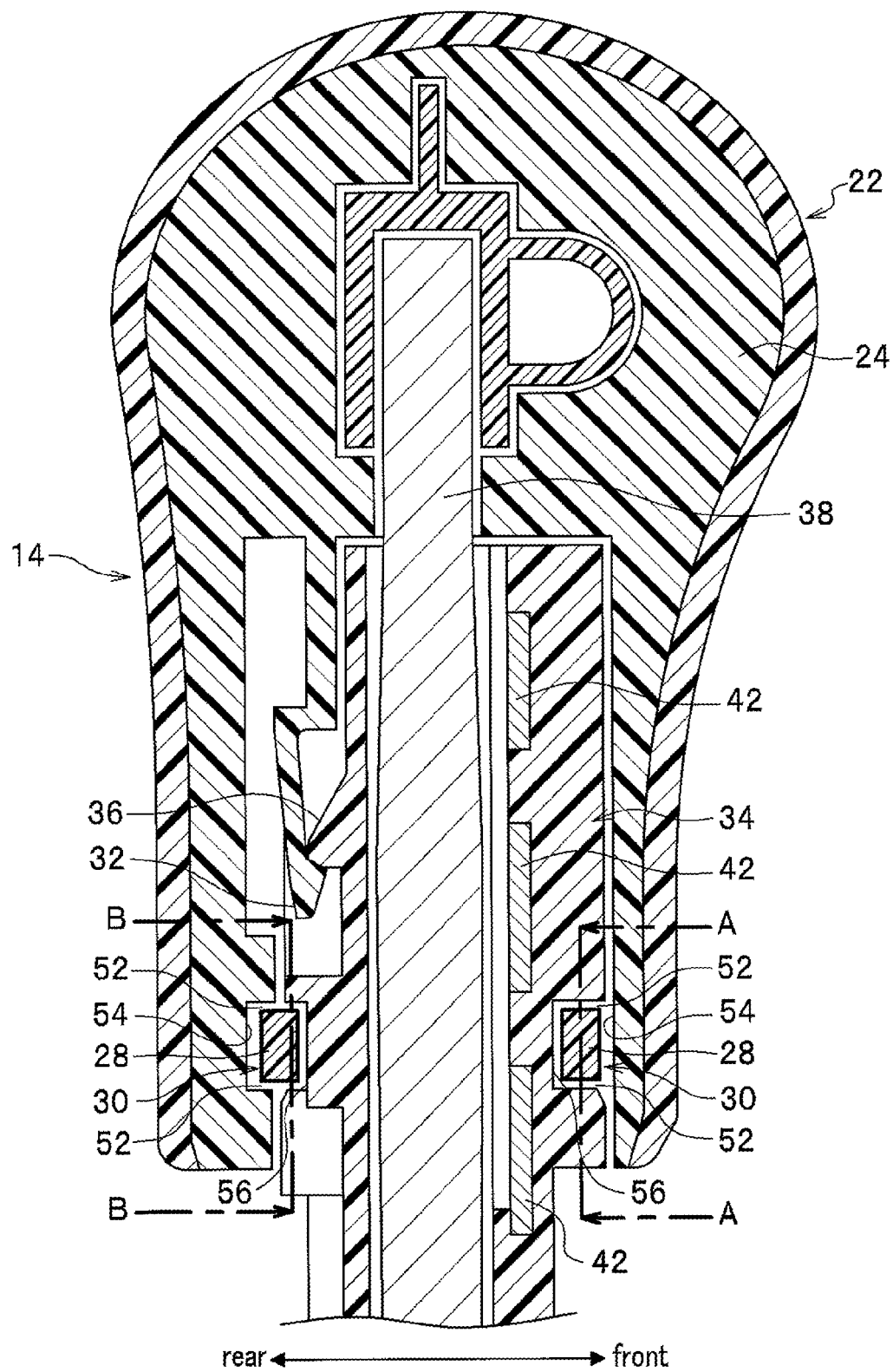
FIG. 8 is a vertical cross-sectional view showing a state that protruding portions are inserted in slot portions.

Further, on the lower portion of the lower side of the hook portion 36, there is provided the slot portions 30 (slot shaped portions or through-hole shaped portions, see FIG. 2) that extend in the direction substantially perpendicular to the axial direction of the lever outer circumferential portion 34 and have a substantially rectangular shape. In a state that the lever part 12 is attached to the knob inner portion 24, the protruding portions 28 formed on the knob outer portion 22 are fitted to the slot portions 30 with a certain gap 52 (see FIG. 8, FIGS. 9A and 9B). Incidentally, the slot portions 30 may be formed in either a slot shape or a through-hole shape.

That is, as shown in FIG. 2 and FIG. 7, the inner wall, on the lower end side, of the knob inner portion 24 is provided with a pair of recessed portions 54, the recessed portions 54 facing each other, substantially in a rectangular shape corresponding to the cross-sectional shape of the protruding portions 28, wherein the pair of recessed portions 54 extends in a direction substantially perpendicular to the axial direction of the knob inner portion 24, along the insertion direction of the protruding portions 28. Further, the outer walls of the lever outer circumferential portion 34, the outer walls facing each other, are provided with a pair of recessed portions 56 substantially in a rectangular shape corresponding to the cross-sectional shape of the protruding portions 28. The pair of recessed portions 56 extends in a direction substantially perpendicular to the axial direction of the lever outer circumferential portion 34, along the insertion direction of the protruding portions 28.

The paired recessed portions 54 of the knob inner portion 24 and the paired recessed portions 56 of the lever outer circumferential portion 34 are formed at positions corresponding to each other with respect to the upper/lower direction. The recessed portion 54 of the knob inner portion 24 on one side and the recessed portion 56 of the lever outer circumferential portion 34 on the other side are joined with each other, and the slot portions 30 are thereby formed (see FIG. 8). Incidentally, the bottom wall forming the recessed portions 54 of the knob inner portion 24 is formed in parallel to the axial direction of the lever outer circumferential portion 34. The bottom wall forming the recessed portions 56 of the lever outer circumferential portion 34 is formed in parallel to the axial direction of the lever outer circumferential portion 34. A latch structure is formed by inserting the protruding portions 28 into the recessed portions 30. Gaps 52 along the upper/lower direction are formed between the upper surface or the lower surface of the each protruding portion 28 inserted in the corresponding recessed portion 30 and the inner wall of the recessed portion 30. The latch structure at the protruding portions 28 will be described later in detail.

The shift device 10 in the present embodiment is basically structured as described above, and the operation and the effect thereof will be described below.

First, the manufacturing process for the lever part 12 will be briefly described.

A metal plate, not shown, is formed into a component having an open cross-sectional shape by stamping. Further, by performing resin molding for coating the outer surface of this component by a resin material, for example, using a mold or the like, the lever part 12 can be easily manufactured by a simple process. In the present embodiment, by adopting such a manufacturing method, the manufacturing cost can be reduced and adequate stiffness and strength of the lever part 12 are ensured.

In the present embodiment, in attaching the lever part 12 and the operation knob 14 to each other, by only inserting the lever part 12 into the fitting hole of the knob inner portion 24, the lever part 12 can be easily held. Further, the lever part 12 is hooked toward the inside of the knob inner portion 24 by the claw portion 32. Thus, backlash of the lever part 12 along the axial direction (the upper/lower direction) can be reduced.

Further, in the present embodiment, for example, when a heavy load is applied to the operation knob 14 along the pull-off direction (the upper/lower direction), even if it happens that the lever part 12 separates off from the claw portion 32, as the protruding portions 28 of the knob outer portion 22 (knob cover 22b) is fitted inside the slot portions 30 of the lever part 12 with the latch structure, the operation knob 14 is ensured to be prevented from getting off from the lever part 12.

Herein, based on FIGS. 2, 6A, 6B to FIGS. 9A, 9B, the latch structure will be described in detail below.

Figure 9A:
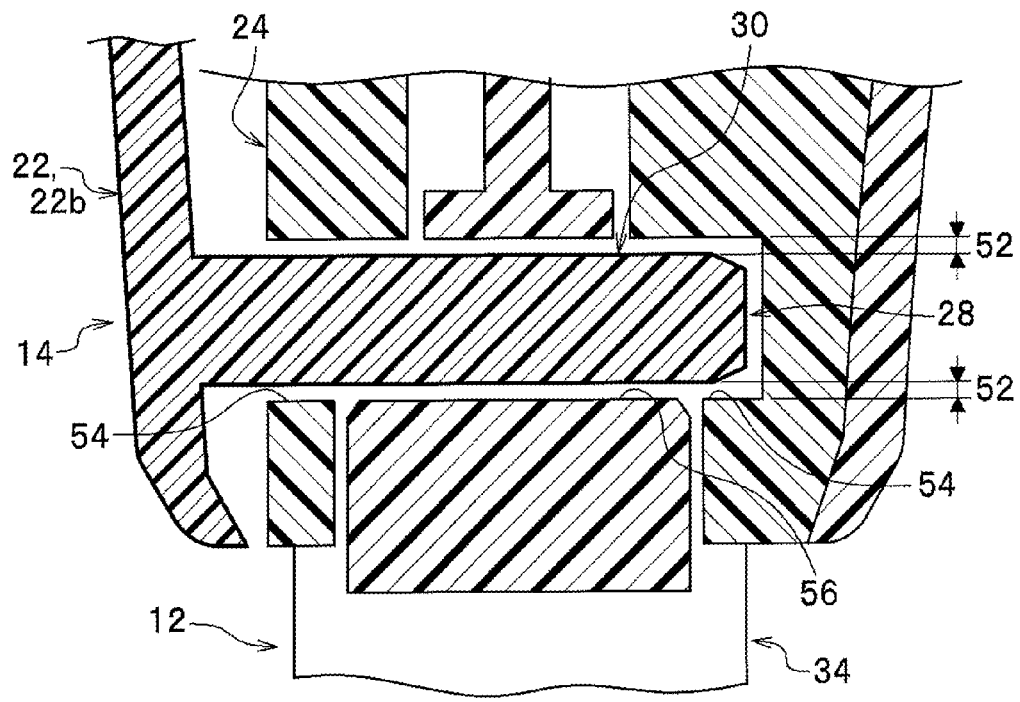
FIG. 9A is an enlarged cross-sectional view taken along line A-A in FIG. 8.
Figure 9B:
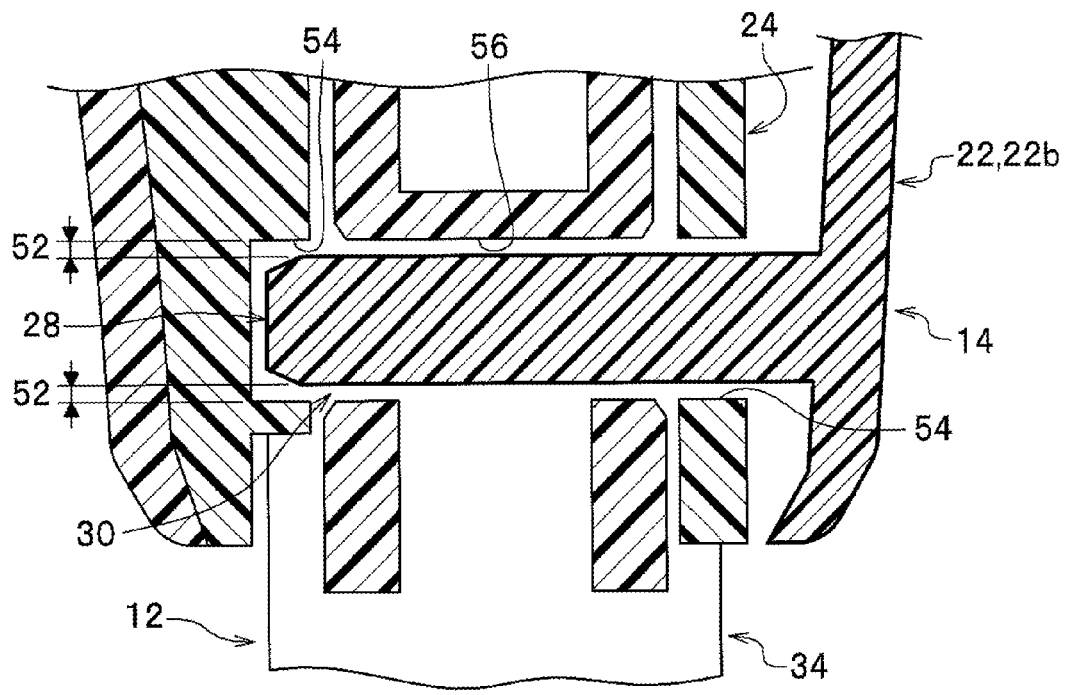
FIG. 9B is an enlarged cross-sectional view taken along line B-B in FIG. 8.

As shown in FIGS. 9A and 9B, the protruding portions 28 extending in the direction substantially perpendicular to the axial direction of the lever part 12 are inserted into the slot portions 30 that are formed by the respective rectangular recessed portions 54 formed on the knob inner portion 24 and the respective rectangular recessed portions 56 formed on the lever outer circumferential portion 34, and the protruding portions 28 are thereby prevented from moving off. Thus, it is possible to prevent the operation knob 14 from moving off.

In this case, as shown in FIGS. 9A and 9B, the protruding portions 28 function as cross bars of a latch structure, wherein the rectangular recessed portions 56 formed, substantially at the central part of the protruding portions 28, on the lever outer circumferential portion 34 and these protruding portions 28 engage with each other. Further, on the one end portion side and the other end portion side along the axial direction of the protruded portions 28, the protruding portions 28 engage with the rectangular recessed portions 54 formed on the knob inner portion 24. Thus, a latch structure that prevents the operation knob 14 from being pulled off from the lever part 12 is formed.

Further, in the present embodiment, gaps 52 are formed between the slot portions 30 (recessed portions 54 and 56) and the protruding portions 28, the gaps 52 being along the direction (insertion direction) of attachment between the operation knob 14 and the lever part 12. Accordingly, even in case that a dimension error is caused, for example, by a manufacturing error or the like, the dimension error is absorbed by the gaps 52, and the lever part 12 is accordingly not inhibited from being hooked by the claw portion 32 so that the lever part 12 can be hooked by the claw portion 32. As a result, in the present embodiment, it is ensured that positioning between the operation knob 14 and the lever part 12 can be performed in attaching them to each other.

Still further, in the present embodiment, the hook portion 36 that hooks the claw portion 32 is arranged at a part inside the lever outer circumferential portion 34, the part being in the open direction where the lever plate 42 is not arranged, and the resin hook portion 36 is also deformable when the hook portion 36 engages with the claw portion 32. As a result, in the present embodiment, the lever part 12 can be easily inserted into the knob inner portion 24, and the stiffness of the lever part 12 itself is ensured by the metal lever plate 42.

Yet further, in the present embodiment, as the metal lever plate 42 is formed such as to have an open cross-sectional shape, wherein the lever plate 42 has an opening portion 46 at a part thereof, the open cross-sectional shape being substantially a C-shape, substantially a U-shape, or the like. Thus, the lever plate 42 can be formed easily by only stamping. As a result, in the present embodiment, it is necessary to perform neither through-hole machining nor slot machining of a shift lever, unlike a conventional technology, which uses a cylindrical component or a solid component. Thus, it is possible to simplify the manufacturing process and reduce the manufacturing cost (machining cost).

Further, in the present embodiment, as the lever outer circumferential portion 34 is formed by resin molding that coats the metal lever plate 42 by a resin material, for example, by providing in advance a mold (casting mold) with an attachment structure to be attached to the operation knob 14, it is possible to easily perform integral forming As a result, according to the present invention, the manufacturing cost can be reduced.

Still further, according to the present invention, by forming the lever part 12 by coating the outer surface of the metal lever plate 42 by a resin material, adequate stiffness and strength of the lever part 12 are ensured. As a result, in the present embodiment, while the manufacturing cost (machining cost) is reduced, stiffness and strength of the lever part 12 are ensured.

For a conventional shift device, in general, a structure in which an operation knob 14 is moved forward and backward in the vehicle front/rear direction is adopted, and a load is often applied to a lever part 12 in the vehicle front/rear direction. In this situation, in the present embodiment, by setting the open direction of the lever plate 42 to the vehicle front or rear direction, desired stiffness and strength against a load during operation of the shift device 10 can be attained, and the durability can thereby be improved, even when the lever plate 42 has an open cross-sectional shape (for example, a substantially C-shaped cross-section, a substantially U-shaped cross-section, or the like).

Yet further, in the present embodiment, the open direction of the open cross-sectional shape of the metal lever plate 42 is set to the direction where the first extended portion 51 of the lever outer circumferential portion 34 is provided (see FIG. 3), and further, the second extended portion 53 is provided by extending the open end portion 42a of the lever plate 42 to the inside of the first extended portion 51 (see FIG. 4). Thus, it is possible to increase the strength of the part in the vicinity of the first extended portion 51 of the resin lever outer circumferential portion 34, which is rotatably attached to the bracket 16, and reduce the machining cost for reinforcing the first extended portion 51.

For example, as in the case of a conventional technology, in case that a lever part is formed by a pipe component, and this pipe component is coated by a resin lever outer circumferential portion to thereby form a first extended portion, it is necessary to arrange an extra component by welding or the like in order to reinforce the strength and the stiffness of the first extended portion, and the machining cost significantly increases. In the present embodiment, it is possible to eliminate such a problem of a significant increase in the machining cost.

DESCRIPTION OF REFERENCE SYMBOLS

10: shift device
12: lever part

14: operation knob
16: bracket
22: knob outer portion
22a: outer casing (the other one portion of nob outer portion)
22b: knob cover (one portion of nob outer portion)
24: knob inner portion
28: protruding portion
30: slot portion (slot shaped portion or through-hole shaped portion)
32: claw portion
34: lever outer circumferential portion
36: hook portion
42: lever plate
42a: open end portion
46: opening portion
50: rotation shaft
51: first extended portion
52: gap
53: second extended portion
54. 56: recessed portion (slot shaped portion or through-hole shaped portion)

The invention claimed is:

1. A shift device, comprising:
a lever part for selecting a drive gear position or a drive range; and
an operation knob provided at an upper end of the lever part,
wherein the operation knob includes:
a knob outer portion forming an outer portion of the operation knob; and
a knob inner portion that is housed in the knob outer portion, wherein one end portion of the lever part is inserted in the knob inner portion,
wherein the knob inner portion includes a claw portion that allows insertion of the lever part when the lever part is to be inserted and hooks the lever part toward inside of the knob inner portion after the lever part is inserted,
wherein the lever part is provided with a slot shaped portion or a through-hole shaped portion extending along a direction perpendicular to an axial direction of the lever part,
wherein the knob outer portion is formed in at least two divisions,
and wherein one division of the divided knob outer portion is provided with a protruding portion that protrudes toward the other one division of the divided knob outer portion and is fitted within the slot shaped portion or the through-hole shaped portion in a state that the lever part is attached to the knob inner portion.

2. The shift device according to claim 1, wherein a gap is formed between the slot shaped portion or the through-hole shaped portion and the protruding portion in a state that the protruding portion is inserted in the slot shaped portion or the through-hole shaped portion.

3. The shift device according to claim 1,
wherein the lever part includes:
a metal lever plate extending along the axial direction of the lever part; and
a lever outer circumferential portion that coats an outer surface of the lever plate by a resin material and is joined with the operation knob,
and wherein the lever plate is formed with an open cross-sectional shape opening in a direction perpendicular to the axial direction of the lever part.

4. The shift device according to claim 2,
wherein the lever part includes:
a metal lever plate extending along the axial direction of the lever part; and
a lever outer circumferential portion that coats an outer surface of the lever plate by a resin material and is joined with the operation knob,
and wherein the lever plate is formed with an open cross-sectional shape opening in a direction perpendicular to the axial direction of the lever part.

5. The shift device according to claim 3, wherein the lever outer circumferential portion is provided with a hook portion that hooks the claw portion of the knob inner portion, in the open direction of the lever plate.

6. The shift device according to claim 3, wherein the lever plate is arranged on a vehicle body side such that the open direction is along front/rear direction of a vehicle.

7. The shift device according to claim 6,
wherein a bracket for attaching the lever part to the vehicle body side is provided,
wherein the bracket is provided with a rotation shaft that rotatably supports the lever part,
wherein the lever outer circumferential portion includes a first extended portion that extends in either front direction or rear direction of the vehicle and is supported by the rotation shaft,
and wherein the lever plate includes a second extended portion that is open in a direction where the first extended portion is provided, the direction being out of the front/rear directions of the vehicle, wherein the second extended portion is formed by that an open end portion of the lever plate is extended into inside of the first extended portion.

8. A manufacturing method for manufacturing the shift device of claim 1 the method comprising:
forming, by stamping, a metal lever plate that extends along an axial direction of the lever part, wherein a cross-section, of the metal lever plate, perpendicular to the axial direction is in a shape having an opening portion only in one direction; and
forming a lever outer circumferential portion that coats an outer surface of the lever plate by a resin material and is joined with the operation knob,
wherein the lever plate has an open cross-sectional shape that is open in a direction perpendicular to the axial direction of the lever part.

9. The shift device according to claim 4, wherein the lever plate is arranged on a vehicle body side such that the open direction is along front/rear direction of a vehicle.

10. The shift device according to claim 9,
wherein a bracket for attaching the lever part to the vehicle body side is provided,
wherein the bracket is provided with a rotation shaft that rotatably supports the lever part,
wherein the lever outer circumferential portion includes a first extended portion that extends in either front direction or rear direction of the vehicle and is supported by the rotation shaft,
and wherein the lever plate includes a second extended portion that is open in a direction where the first extended portion is provided, the direction being out of the front/rear directions of the vehicle, wherein the second extended portion is formed by that an open end portion of the lever plate is extended into inside of the first extended portion.

11. The shift device according to claim 5, wherein the lever plate is arranged on a vehicle body side such that the open direction is along front/rear direction of a vehicle.

12. The shift device according to claim 11,
- wherein a bracket for attaching the lever part to the vehicle body side is provided,
- wherein the bracket is provided with a rotation shaft that rotatably supports the lever part,
- wherein the lever outer circumferential portion includes a first extended portion that extends in either front direction or rear direction of the vehicle and is supported by the rotation shaft,
- and wherein the lever plate includes a second extended portion that is open in a direction where the first extended portion is provided, the direction being out of the front/rear directions of the vehicle, wherein the second extended portion is formed by that an open end portion of the lever plate is extended into inside of the first extended portion.

* * * * *